Sept. 4, 1934.   H. MARTIN   1,972,154
MEASURING DEVICE
Filed July 20, 1932

WITNESS:
Fred Roeger

INVENTOR-
Harry Martin
BY Edward Thomas,
his ATTORNEY-

Patented Sept. 4, 1934

1,972,154

UNITED STATES PATENT OFFICE 1,972,154

MEASURING DEVICE

Harry Martin, New York, N. Y.

Application July 20, 1932, Serial No. 623,493

9 Claims. (Cl. 221—147)

This invention relates to measuring devices, and is herein illustrated as embodied in a bottle, or a cap adapted to be attached to a bottle, so that a definite quantity of a substance, especially a liquid substance, can be easily measured or segregated within the bottle or within the cap, and then the measured quantity can be poured off without further attention, leaving the remainder of the substance in the bottle.

The invention is well adapted to be used for measuring doses of medicines. For this purpose the medicine is kept in a bottle provided with a measuring device of the capacity required to deliver one dose, the device being either in a removable cap or embodied in the bottle itself.

To attain these and other ends, the usual body of the bottle is provided with the usual neck, or, if necessary, with an enlarged neck. When the bottle is tilted sufficiently, or is shaken to splash liquid around in it, some of the liquid, usually in excess of the desired dose, flows into the neck and is trapped there or is trapped in the removable cap. Then the bottle is held upright, and any excess of liquid over that needed for the dose flows back into the bottle through an overflow, leaving just the desired measured quantity for the dose in the neck or in the cap, as the case may be.

In the form herein illustrated, the device for trapping the necessary quantity of liquid is shown as a transverse partition in the form of a hollow cone springing upwardly from the inner wall of the neck or cap, the top of the cone being open to form the overflow for the excess liquid. The desired dose is trapped between the outer wall of the cone and the inner wall of the neck or cap.

It is found that many liquids, such as water, readily flow out though slowly through the open top of the cone when the bottle is tilted, but will refuse to flow out through the open top of the cone if the bottle is inverted or held nearly inverted.

It thus becomes possible to provide bottles with caps for simply and accurately measuring doses of medicine without any careful attention. If desired, as is indicated above, the bottle itself may have the measuring device incorporated in its neck.

Other features and advantages will hereinafter appear.

Figure 1:
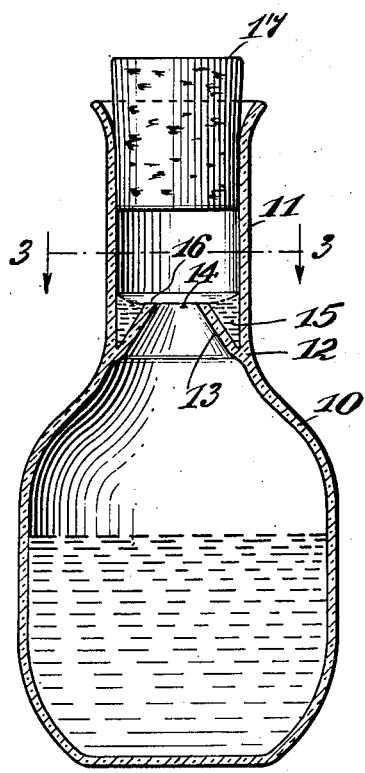
Figure 1 is a sectional view of a bottle embodying the invention in its simplest form.

The flask or bottle body 10 illustrated in Figure 1 is shown as having a wide neck 11 springing from the body of the bottle at 12. Within the neck 11 is shown an internal cone 13, fused to the inner surface of the neck about at the point 12. The cone is shown as provided with an open top 14, so that if the liquid fills the annular space 15 between the cone 13 and the inner surface of the neck 11, excess liquid runs back over the edge 16, leaving the desired measured quantity in the annular space 15.

By making the cone 13 and neck 11 of proper size, any desired quantity of liquid can be measured off, and then poured off as a dose of medicine. To fill the annular space, the bottle may be inclined, usually without removing the cork 17, so that liquid runs out of the body 10, through the opening 14. When more liquid has run into the neck 11 than is needed, the bottle is restored to upright position, excess liquid runs back into the body 10 through the opening 14, leaving the desired dose in the annular space 15. The cork is removed and the desired dose thus measured is poured out.

Figures 2, 3:
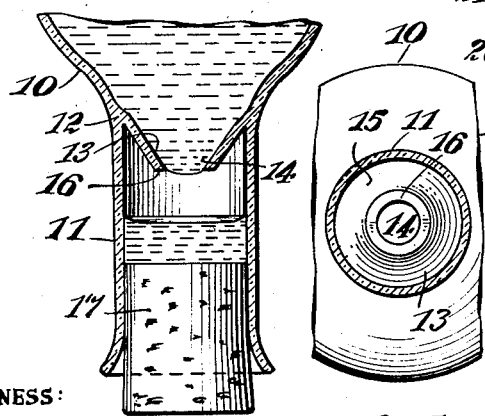
Figure 2 shows the bottle inverted with a measured dose held in by the cork and the remainder of the liquid held in the body of the bottle.
Figure 3 is a cross sectional view of the parts seen on the line 3—3 of Figure 1.

It is found that water will not easily run out of the body 10 through the opening 14 shown, when the bottle is fully inverted as shown in Figure 2. In the bottle shown the opening 14 has a flat top or edge 16 and is about nine thirty-seconds of an inch across the open space, and the cone walls are at an angle of about 66° from each other. Thus the person measuring the quantity or desired dose need give no attention beyond filling up the annular space 15 in the neck at least as high as the edge 16 and emptying the measured quantity fairly quickly. In the bottle shown, with a neck a little less than an inch in internal diameter the annular space measures off a teaspoonful.

Figure 4:
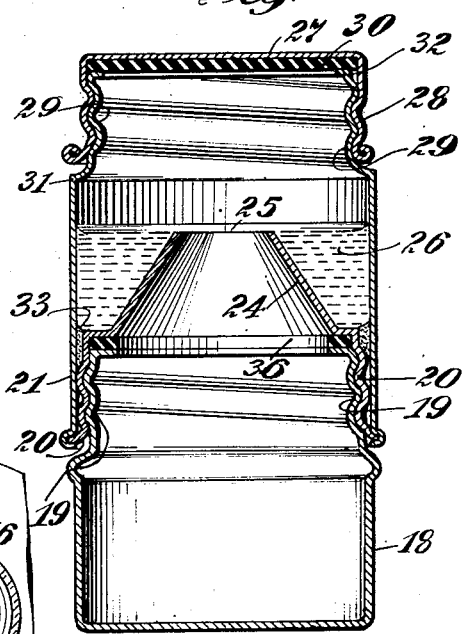
Figure 4 shows a measuring cap provided with covers but adapted to be screwed on to a bottle when one cover is removed.

The invention is well adapted to be applied in other forms so that the bottle need not be especially constructed. One device embodying another form of the invention is illustrated in Figure 4, as a measuring device to be screwed on a familiar type of bottle used by druggists in filling prescriptions. When the measuring device is not in use, the same is protected from the entry of dust or other foreign matter thereinto by the use of a bottom cap 18 which closes the lower end of the measuring device, and a top cap 27, which closes the upper end of the measuring device.

To use the device shown in Figure 4, the dirt-excluding cap 18 is turned, unscrewing its thread 19 from the female thread 20 of the cap proper. The female thread 20 of the cap lies in a tubular body 21 of the cap so that the body may now be screwed down on the neck of a standard threaded neck 22, with a thread 23, as is shown for the modified cap in Figure 5.

Within the body 21 is mounted a cone 24, like the cone 13 of Figure 1, and, like it, provided with an open end 25 of suitable size to retain the liquid when the capped bottle is inverted, and yet adapted to drain off all liquid in excess of that caught in the annular space 26 between the cone and the tubular body 21.

The cap body is also shown as provided with a closure cap 27 having a female thread 28 adapted to be screwed down on a male thread 29, on an upper extension 31 of the tubular body 21. It is shown as provided with a gasket 30 adapted to seal the top 32 of the upper extension 31, thus making it safe to carry the bottle in any position while provided with its measuring cap.

With this description of the device in mind, it will be apparent that use of the measuring device with an ordinary medicine bottle, or other suitable liquid container, can be accomplished in the following manner. The lower cap 18 can be removed from the measuring device as well as the upper cap 27. The measuring device is then fastened to the outlet of the medicine bottle or other liquid container, and the original cap 27 placed on the top if desired, or the cap which is supplied with the medicine bottle may be placed on the top. This latter procedure is made possible by having the upper external threads of such size as to receive a cap which would normally fit on the external threads of the medicine bottle. By insepection of the drawing, it will be seen that the upper cap 27 will readily fit on the lower cap 18 due to the similarity of internal and external threads. Thus, a user of the dispensing device in connection with a medicine bottle could remove the cap from the medicine bottle, place the dispensing device onto the neck of the bottle and close the same at the upper end by threading the cap removed from the medicine bottle on the upper threads of the dispensing device.

In the form shown by way of illustration, the thread 20 is a separate piece of metal inserted in the metal tubular body 21, and the cone is soldered at 33 to both the body 21 and the metal thread piece 20, thus making a cheap tight joint.

Figure 5:
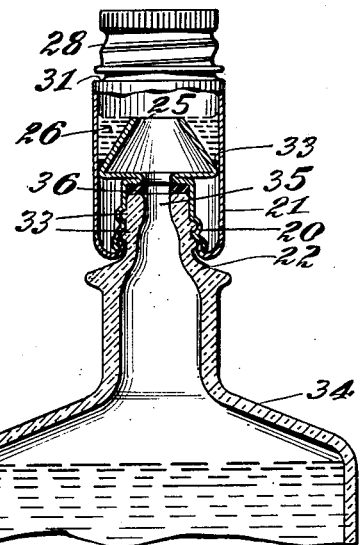
Figure 5 shows a modified form of a cap screwed on a bottle neck and holding a measured dose of liquid.

The form of the device shown in Figure 5 is one adapted to fit a bottle 34 with a small mouth 35, provided with a male thread 23. The thread 20, as shown, is generally spaced away from the body 21 to provide a sufficient annular measuring space or volume 26 for the very common dose of one teaspoonful.

Moreover when the annular measuring space is empty the bottle can be shaken or tapped to deliver a drop at a time.

It will be observed that the cap unit shown in Figure 4 can be sold sterilized and carried around in a pocket without soiling any part which will come in contact with the liquid, and yet it can be manufactured at trivial expense out of many materials. Even the gasket 36 to fit on the end of the bottle is protected by the dirt-excluding cap 18 until the cap is removed.

Having thus described certain embodiments of the invention, what is claimed is:

1. A liquid measuring device including a tube, a conical partition in the tube adapted to trap a measured quantity of liquid between the cone wall and the tube wall, said partition terminating short of the apex of the cone so as to drain back through the cone liquid in excess of said quantity, but terminating so near the apex that the aperture is so small that liquid within the cone when the device is inserted will be retained by the partition wall, bridging the opening, the tube being of sufficient length and sufficiently greater diameter than the opening formed by the cut-off top of the partition to trap liquid in excess of that retained by the partition wall.

2. A liquid measuring device including a tube, a conical partition in the tube adapted to trap a quantity of liquid between the cone wall and the tube wall, said partition terminating short of the apex of the cone to leave an opening about nine thirty-seconds of an inch in diameter, so that liquid below the partition will be retained by the cone opening when inverted, the tube being of sufficient length and sufficiently greater diameter than the opening formed by the cut-off top of the partition to trap liquid in excess of that retained by the partition wall.

3. A liquid measuring device including a tube, a conical partition in the tube having a wall inclined at an angle of about 66° from the horizontal and terminating short of the apex so as to leave an opening not exceeding about nine thirty-seconds of an inch in diameter, so that liquid below the partition will be retained by the cone opening when inverted, the tube being of sufficient length and sufficiently greater diameter than the opening formed by the cut-off top of the partition to trap liquid in excess of that retained by the partition wall.

4. The combination with a container for liquids, of a tapered walled partial closure member for said container, said closure member having a restricted outlet opening therein of such size that liquid normally will not pass therethrough from the body of the container when the container is in inverted position, and a chamber in communication with said opening and separated from the body of the container by said closure member, said chamber being of such size as to hold a quantity of liquid forced through said opening from the body of the container, said quantity being determined by the height of said tapered wall partial closure member, said chamber being provided with an outlet opening.

5. The combination with a container for liquids of a tapered walled partition within said container near the top thereof dividing the container into a lower body portion and an upper chamber, said upper chamber having a discharge opening, said partition having a restricted opening at the apex thereof of such size that liquid normally will not pass therethrough from said body portion when the container is inverted, said chamber being of such size as to hold a predetermined quantity of liquid forced through said opening from the body portion and trapped by said partition.

6. An attachment for liquid containers comprising a substantially hollow body to be secured to the outlet of the container, a tapered walled partition in said body forming the bottom of a chamber in the upper part of the body, said partition having a restricted opening at substantially the apex of the tapered wall thereof of such size that liquid normally will not pass therethrough from said container when the container is inverted, said chamber being of such size as to hold a predetermined quantity of liquid forced through said opening from said container, and a closure cap removably secured to the top of said hollow body.

7. A liquid measuring device comprising a tube having open ends and having threads at one end by which it is adapted to be made fast to a container, a transverse partition in the tube partly at one height and partly at another height from the base of the tube, said partition having at the highest part thereof an opening large enough to drain through the partition liquid above the height of the opening but to retain a measured quantity of liquid trapped between the partition and the side of the tube, such opening being of such small size as to retain liquid in the container when the container is inverted.

8. A liquid measuring device including a tube open at the ends and having a thread by which it is adapted to be made fast to a bottle, a conical partition in the tube having an open end at the apex thereof, said open end adapted to drain back into the tube through the cone liquid in excess of a predetermined quantity trapped between the cone wall and the side of the tube, and also being of such a size that it retains the liquid in an inverted bottle so that the liquid fails to flow through the open end of the cone.

9. A liquid measuring device including a tube open at the ends and having a threaded end by which it is adapted to be made fast to a container, a conical partition in the tube having an open end, said open end adapted to drain back into the container through the cone liquid in excess of that trapped between the side walls and the side of the tube, and also being of such a size that it retains the liquid in the container when inverted so that the liquid fails to flow through the open end of the cone, a thread on the other end of the tube, a closure adapted to fit said last named thread, and a closure adapted to fit the first named thread.

HARRY MARTIN.